(12) United States Patent
Takano et al.

(10) Patent No.: US 6,856,904 B2
(45) Date of Patent: Feb. 15, 2005

(54) GPS RECEIVER AND NAVIGATION DEVICE

(75) Inventors: Syuichi Takano, Minori (JP); Hiroki Uchiyama, Hitachinaka (JP)

(73) Assignee: Xanavi Informatics Corporation, Zama (JP)

(*) Notice: Subject to any disclaimer, the term of this patent is extended or adjusted under 35 U.S.C. 154(b) by 0 days.

(21) Appl. No.: 10/445,260

(22) Filed: May 27, 2003

(65) Prior Publication Data

US 2004/0049342 A1 Mar. 11, 2004

(30) Foreign Application Priority Data

May 24, 2002 (JP) ........................................ 2002-150084

(51) Int. Cl.$^7$ ............................................... G01C 21/26
(52) U.S. Cl. ...................................... 701/213; 342/358
(58) Field of Search ................................ 701/213, 214; 342/358, 458; 375/150

(56) References Cited

U.S. PATENT DOCUMENTS 5,963,167 A * 10/1999 Lichten et al. ......... 342/357.06
2001/0009563 A1 * 7/2001 Kohli et al. ................. 375/150

* cited by examiner

Primary Examiner—Marthe Y. Marc-Coleman
(74) Attorney, Agent, or Firm—Antonelli, Terry, Stout & Kraus, LLP

(57) ABSTRACT

A GPS (Global Positioning System) receiver and a navigation device and system utilizing the same includes a receiver which sequentially generates GPS data including current position information, based on signals received from GPS satellites. The GPS receiver further includes at least one filter which performs filtering with respect to the GPS data sequentially generated by the receiver and generates positioning data including the current position information, and a positioning data output device which selects a filter according to a selection signal and outputs the positioning data in accordance therewith.

10 Claims, 4 Drawing Sheets

GPS RECEIVER AND NAVIGATION DEVICE

BACKGROUND OF THE INVENTION

The present invention relates to a GPS (Global Positioning System) receiver and a navigation device utilizing the GPS receiver.

The GPS receiver continuously receives signals put out from at least three GPS satellites. Further, every predetermined period of time (e.g., per one second), the GPS receiver measures distances up to each of the three GPS satellites and a change rate of those distances, thereby generating GPS data including a current position and a traveling direction (orientation). The GPS receiver also performs filtering with respect to the GPS data thus sequentially generated, and generates positioning data to be outputted to a navigation device and the like. For example, a least-squares method is applied on a predetermined number of GPS data items, which have been generated within a predetermined period of time, and a result of the least-squares method is outputted as positioning data. As an apparatus for performing such a filtering, Kalman filter is well known.

SUMMARY OF THE INVENTION

Recently, as one of navigation device for obtaining information such as a current position and a traveling direction utilizing positioning data from the GPS receiver, there is suggested a device which is provided with so-called telematics function, in addition to original navigating function such as current position displaying and route guidance. According to this telematics function, for example, by accessing a service center via a mobile communication system in the event of emergency, such as vehicle trouble, the service center is notified of the emergency occurrence together with the current position information.

In the meantime, for the navigation function such as current position displaying and route guidance, a certain degree of positioning precision is required in the positioning data to be used, so as to prevent an error such that a current position is set on a wrong route as a result of map matching. On the other hand, for the telematics function to notify the current position in an emergency, a high positioning rate is generally required, rather than the high positioning precision. In other words, it is required to obtain positioning data immediately. However, this point has not been considered so far.

The present invention has been made in view of the above situation, and an objective of the present invention is to allow a GPS receiver to output positioning data, having a positioning precision or a positioning rate appropriate to intended use.

In order to solve the above problem, the GPS receiver of the present invention comprises a receiving means which sequentially generates GPS data including current position information based on a signal received from a GPS satellite, a plurality of filtering means which perform filtering with respect to the GPS data thus sequentially generated by the receiving means and for generating positioning data including the current position information, and a positioning data output means which selects any one of the plurality of filtering means in accordance with a selection signal inputted, and for outputting the positioning data generated by the filtering means thus selected.

Here, it is preferable that the plurality of filtering means are provided with different degrees of positioning precision respectively (precision of the positioning data itself). In general, the positioning precision is traded off for increasing the positioning rate (a probability that a valid positioning data can be measured). In other words, when the positioning precision is raised, the positioning rate is deteriorated, whereas the positioning rate is raised, the positioning precision is deteriorated.

With the above GPS receiver, it is possible, according to a selection signal, to output positioning data having the positioning precision or the positioning rate appropriate to the intended use.

In the GPS receiver of the present invention, instead of the plural filtering means, it is also possible to provide one filtering means which performs filtering, according to a given condition, with respect to the GPS data sequentially generated by the receiving means, so as to generate positioning data.

In addition, according to the selection signal, the positioning data output means may be allowed to select the given condition as one of a plurality of conditions being prepared, and thus selected condition may be given to the filtering means.

In addition, the navigation device of the present invention, which can be used being connected with the GPS receiver of the present invention comprises a navigation means which performs a navigation process based on the positioning data outputted from the GPS receiver, telematics means which performs telematics process by use of the positioning data outputted from the GPS receiver, and a selection signal output means which outputs the selection signal to the GPS receiver.

In addition, in the case where the navigation means uses the positioning data, the selection signal output means outputs a selection signal for raising the positioning precision of the GPS receiver more than or equal to a certain value, whereas in the case where the telematics means uses the positioning data, the selection signal output means outputs a selection signal for raising the positioning rate of the GPS receiver more than or equal to a certain value.

Here, the telematics process corresponds to a process of notifying a service center of emergency occurrence together with the current position information, by accessing the service center via a mobile communication system in the event of emergency such as vehicle trouble.

According to such navigation device, it is possible to allow the GPS receiver of the present invention to output positioning data having either the positioning precision or the positioning rate appropriate to the intended use.

DETAILED DESCRIPTION OF THE PREFERRED EMBODIMENTS

Hereinafter, one embodiment of the present invention will be explained.

Figure 1:
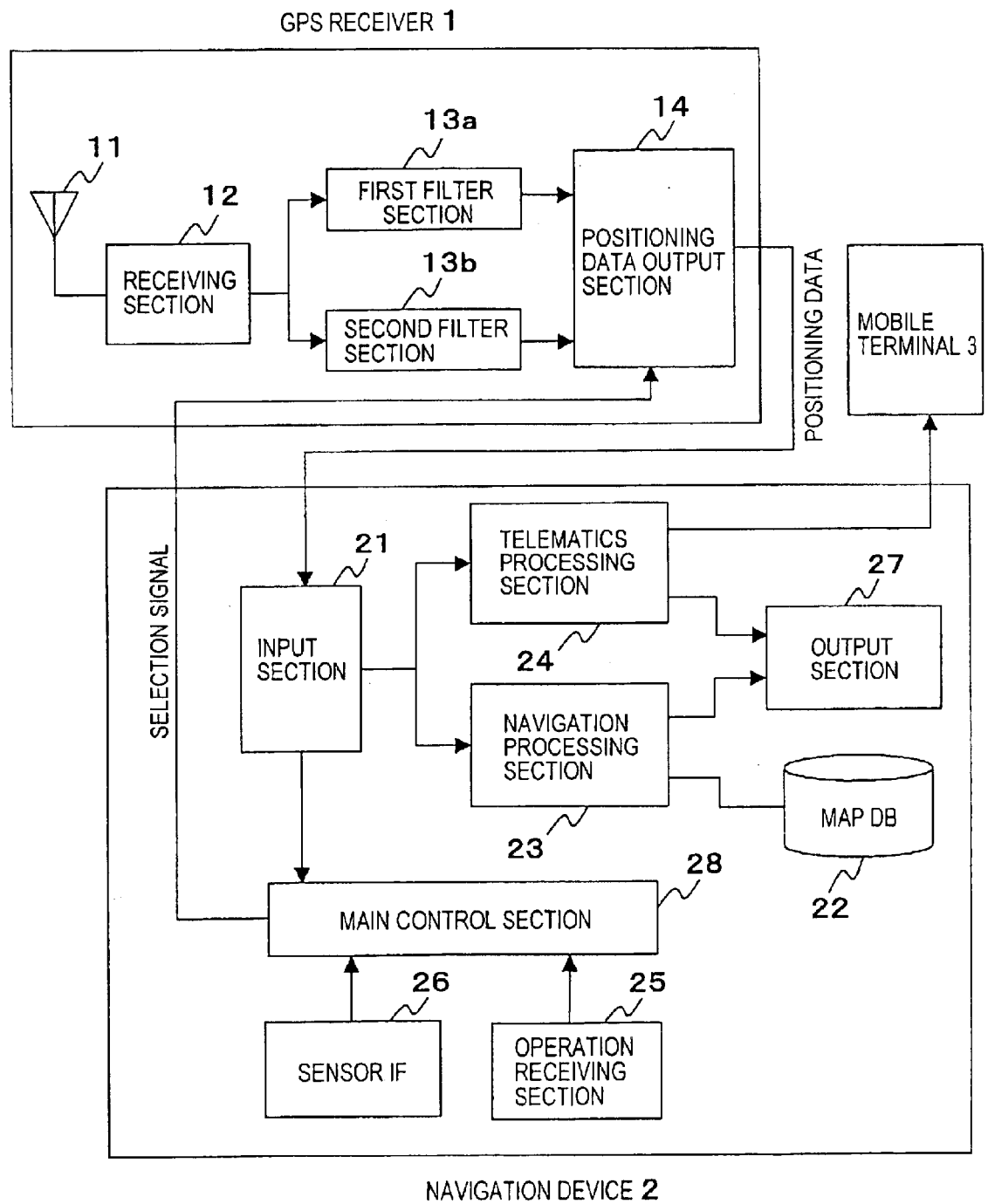
FIG. 1 is a schematic view of a navigation system relating to one embodiment of the present invention.

FIG. 1 is a schematic block diagram showing a navigation system to which one embodiment of the present invention has been applied.

As shown in FIG. 1, the navigation system of the present embodiment comprises a GPS receiver 1, a navigation device 2 and a mobile terminal 3, such as mobile telephone.

Firstly, the GPS receiver 1 will be explained.

The GPS receiver 1 is provided with an antenna 11 for catching a signal outputted from a GPS satellite, a receiving section 12 for continuously receiving the signal outputted from at least three GPS satellites by use of the antenna 11, and for measuring, every first predetermined period of time (e.g., one second), distances up to each of the three GPS satellites and a change rate of those distances, thereby generating GPS data including a current position and a traveling direction (orientation), a first filter section 13a for performing filtering with respect to the GPS data sequentially generated at the receiving section 12 so as to generate positioning data for navigation process, a second filter section 13b for performing filtering with respect to the GPS data sequentially generated at the receiving section 12 so as to generate positioning data for telematics process, and a positioning data output section 14.

The first filter section 13a and the second filter section 13b apply, every second predetermined period of time (e.g., 10 seconds), the least squares-method, for example, to the predetermined number of valid GPS data items having been generated at the receiving section 12 during that period of time. The obtained result is outputted as positioning data.

Here, the valid GPS data indicates GPS data including information such as a current position and a traveling direction. When signals outputted from at least three GPS satellites cannot be received, due to a deterioration of reception circumstances and the like, the receiving section 12 cannot measure the current position and the traveling direction. In such a case, invalid GPS data not containing the information regarding the current position and traveling direction, is outputted from the receiving section 12.

Furthermore, if the valid GPS data items of the predetermined number are not generated within the second predetermined period of time, it is impossible for the first filter section 13a and the second filter section 13b to generate valid positioning data. In this case, invalid positioning data not containing the information regarding the current position and the traveling direction is outputted from the first filter section 13a and the second filter section 13b.

As described above, in the first filter section 13a and in the second filter section 13b, the larger the predetermined number (of the GPS data items) is, the positioning precision is raised, and at the same time, the positioning rate is lowered. In the present embodiment, as to the first filter section 13a, the predetermined number is set to larger number so as to enhance the positioning precision. On the other hand, as to the second filter section 13b, the predetermined number is set to lower number, so as to enhance the positioning rate. For the first filter section 13a and the second filter section 13b, Kalman filter can be employed as a way of example.

The positioning data output section 14 selects either of the first filter section 13a and the second filter section 13b, according to a selection signal from the navigation device 2. The positioning data generated at thus selected filter section is outputted to the navigation device 2.

The GPS receiver 1 having the above configuration can be implemented based on hardware by integrated logic IC, such as ASIC (Application Specific Integrated Circuits), and FPGA (Field Programmable Gate Array). Alternatively, it can be implemented based on software by a computer such as DSP (Digital Signal Processor).

Figure 2:
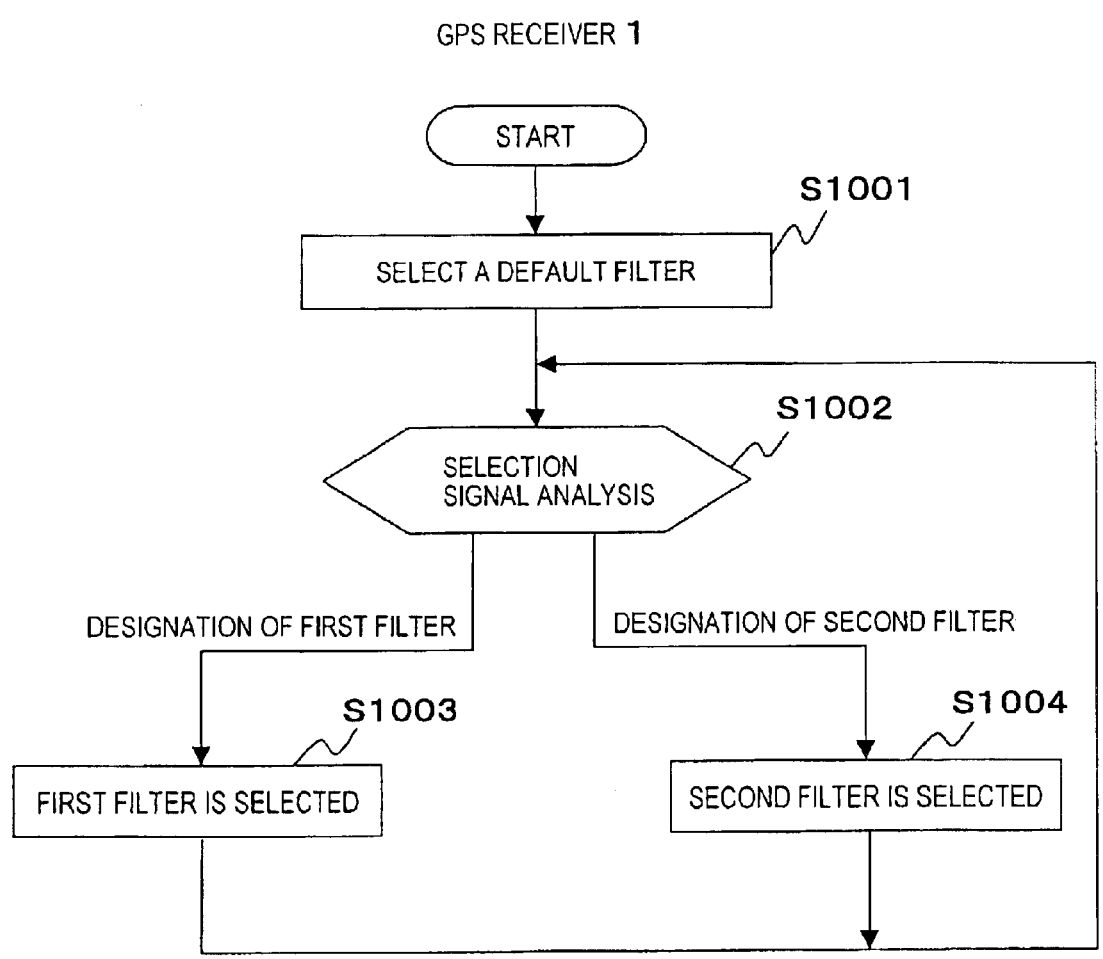
FIG. 2 is an operational flow diagram of the GPS receiver 1 as shown in FIG. 1.

FIG. 2 is an illustration for explaining an operational flow of the GPS receiver 1. This flow starts when power is applied to the GPS receiver 1.

Firstly, the positioning data output section 14 selects a filter section, which is set as a default, out of the first filter section 13a and the second filter section 13b (S1001). Then, the positioning data output section 14 checks a selection signal transmitted from the navigation device 2 (S1002). If the selection signal designates the first filter section 13a, the first filter section 13a is selected (S1003). On the other hand, if the selection signal designates the second filter section 13b, the second filter section 13b is selected (S1004).

Next, the navigation device 2 will be explained, returning to FIG. 1.

The navigation device 2 comprises input section 21 for receiving positioning data outputted from the GPS receiver 1, map database (DB) 22, navigation processing section 23, telematics processing section 24, operation receiving section 25 for receiving an operation from a user, sensor interface (IF) 26 for obtaining information from various vehicle sensors, such as a fuel sensor and an oil temperature sensor, output section 27 including a display and a speaker, and main control section 28 for controlling each of the above sections in centralized manner.

The input section 21 checks whether or not the positioning data is valid or invalid, which is inputted from the GPS receiver 1, every second predetermined period of time (e.g., 10 seconds), and only valid positioning data is passed to the navigation processing section 23 and the telematics processing section 24. Furthermore, the input section 21 measures the positioning rate of the positioning data (rate of valid positioning data out of the positioning data inputted from the GPS receiver 1 within a predetermined period of time up to the present), and then the main control section 28 is notified of the result of the measurement.

For the map DB 22, a recording medium such as CD-ROM, DVD-ROM, memory card, and removable HDD is employed.

According to an instruction from the main control section 28, the navigation processing section 23 performs a navigation process, such as a current position displaying and a route guidance, by use of the positioning data inputted in the input section 21 and the map data stored in the map DB 22, and then outputs the navigation information from the output section 27. Here, in the navigation process, a map matching processing is included to modify the current position indicated by the positioning data to be located on a road. In the map matching processing, a certain degree of positioning precision is required in the positioning data, in order to prevent an error such that the current position is located on a wrong road.

According to an instruction from the main control section 28, the telematics processing section 24 performs a telematics process such as current position notification at the time of emergency by use of the positioning data inputted in the input section 21, and the telematics information obtained from an information management center to which the current position has been notified is outputted from the output section 27. Here, in the current position notification in emergency situation, a higher positioning rate rather than positioning precision is required. In other words, it is required to obtain the positioning data immediately. A mobile terminal 3 is employed for notifying the information management center of the current position and for obtaining the telematics information therefrom.

The main control section 28 controls in centralized manner each section in the navigation device 2, according to the operation contents from a user received via the operation receiving section 25 and sensor information obtained via the sensor IF 26, and then, outputs the navigation information or the telematics information from the output section 27. In addition, the main control section 28 generates a selection signal and outputs it to the GPS receiver 1.

The navigation device 2 having the above configuration is implemented by allowing a CPU to execute a certain programs on a memory, in a computer system comprising the CPU, a memory, an output device such as a display and a speaker, a drive unit for accessing a recording medium such as CD-ROM and DVD-ROM on which map data is recorded and for reading out the data from the recording medium, an input device such as operation panel, and interfaces to the GPS receiver 1 and to the mobile terminal 3, respectively.

Figure 3:
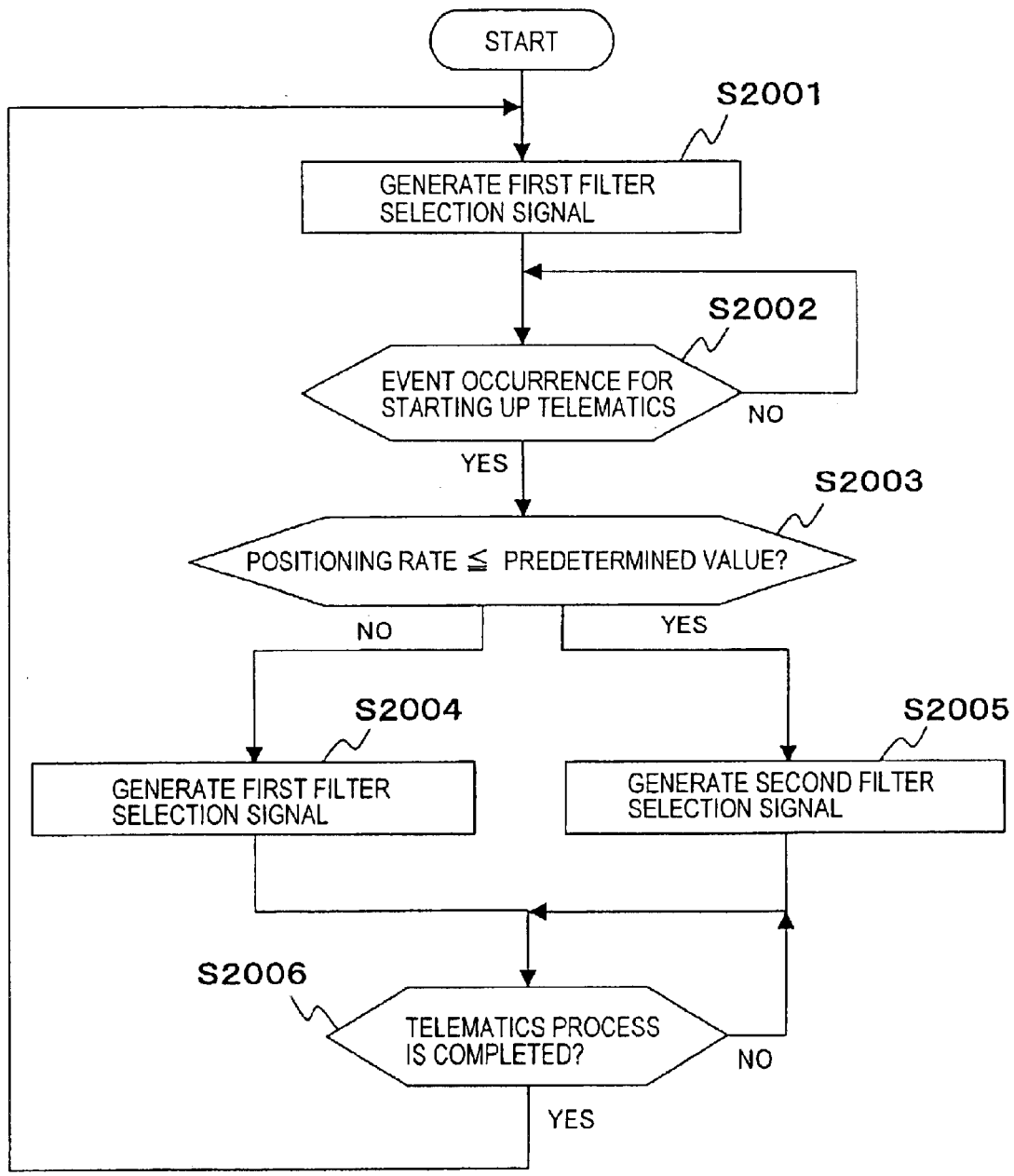
FIG. 3 is an operational flow diagram of a navigation device 2 as shown in FIG. 1.

FIG. 3 is an illustration for explaining the operational flow of the navigation device 2. This flow starts when power is applied to the navigation device 2.

Firstly, the main control section 28 starts generating a selection signal to select the first filter section 13a in the GPS receiver 1, and outputs the selection signal to the GPS receiver 1 (S2001).

Next, the main control section 28 checks whether or not an event has occurred, which becomes a startup trigger of the telematics processing unit 24 (S2002) Here, as an example of the event, which becomes a startup trigger of the telematics processing unit 24, there can be considered a case where an instruction for starting up the telematics processing section 24 (instruction of current position notification in an emergency occurrence) from a user via the operation receiving section 25 is received, or a case where sensor information received via the sensor IF 26 from various vehicle sensors indicates any vehicle abnormality.

In step S2002, when an event that becomes a startup trigger of the telematics processing section 24 is detected, the main control section 28 checks whether or not the positioning rate measured in the input section 21 is equal to or less than a predetermined value. In other words, it is checked if there is a possibility that the telematics processing section 24 cannot obtain the positioning data immediately (for example, within 10 and a few seconds), due to the low positioning rate (S2003). If there is not such a possibility, generating of the current selection signal (a selection signal to select the first filter section 13a) is carried on (S2004). On the other hand, if there is such a possibility, the selection signal to be generated is switched to a different selection signal to select the second filter section 13b, which requires higher positioning rate (lower positioning precision) than the first filter section 13a, and then it is outputted to the GPS receiver 1 (S2005). Then, the main control section 28 returns the process to S2001, when the telematics process at the telematics processing section 24 is completed (S2006).

One embodiment of the present invention has been explained so far.

The GPS receiver 1 of the present embodiment outputs positioning data, which has been obtained from either the first filter section 13a or the second filter section 13b, according to a selection signal from the navigation device 2. Here, the first filter section 13a has positioning precision and positioning rate different from those of the second filter section 13b. Therefore, according to the selection signal, it is possible to output the positioning data having the positioning precision or the positioning rate appropriate to the intended use.

Moreover, in the case where the telematics processing section 24 is started up, which requires a high positioning rate, rather than positioning precision, i.e., requires quickness in obtaining the positioning data, the navigation device 2 of the present embodiment generates a selection signal to select the second filter section 13b having a higher positioning rate (lower positioning precision) than the first filter section 13a. This signal generation to select the second filter section 13b is made when there is a possibility that the positioning rate of the first filter section 13a is equal to or less than a predetermined value, i.e., the positioning data cannot be obtained immediately. If there is not such a possibility, a selection signal to select the first filter section 13a is generated. Therefore, the GPS receiver 1 is allowed to output positioning data having positioning precision or positioning rate appropriate to the intended use.

It should be noted that the present invention is not limited to the above embodiment, and numerous variations are possible within the scope the invention.

For example, in the above GPS receiver 1, as a filter section to generate positioning data by performing filtering with respect to GPS data, there are provided two filter sections, i.e., the first filter section 13a for generating positioning data for navigation process and the second filter section 13b for generating positioning data for telematics process However, the number of the filter section is not limited to two. According to the intended use of the positioning data, three or more of such filter sections having different positioning precision and positioning rate may be provided. Then, the positioning data output section 14 may be allowed to select one of the filter sections along with a selection signal from outside, and to output the positioning data to outside.

In addition, in the GPS receiver 1, one filter section may be provided instead of the plurality of filter sections, and conditions of the one filter section may be changed according to the selection signal.

Figure 4:
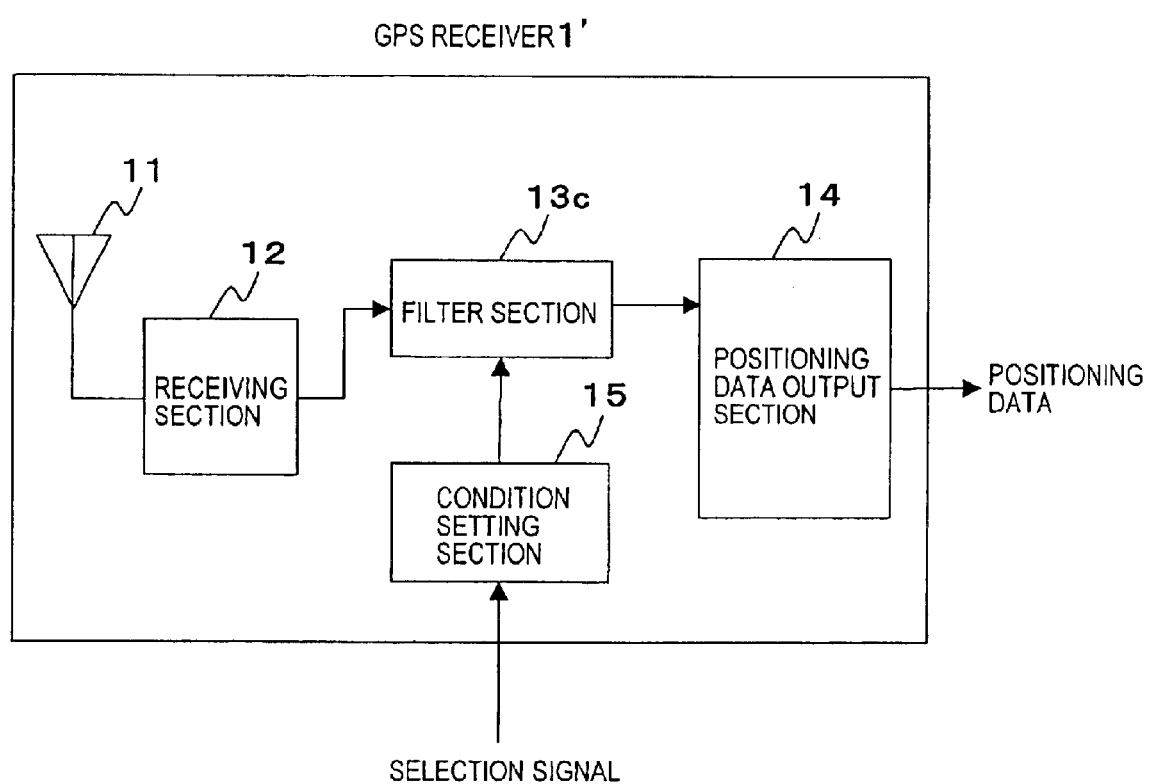
FIG. 4 is a schematic view of a variation of the GPS receiver 1 as shown in FIG. 1 (GPS receiver 1').

FIG. 4 is an illustration showing a variation (GPS receiver 1') of the GPS receiver 1 of the present embodiment. In the GPS receiver 1', a filter section 13c and a condition setting section 15 are provided, instead of the first filter section 13a and the second filter section 13b. This point is different between the GPS receiver 1' and the GPS receiver 1 as shown in FIG. 1.

The filter section 13c follows conditions as set by the condition setting section 15 and performs filtering with respect to the GPS data sequentially generated at the receiving section 12 so as to generate positioning data. Specifically, every second predetermined period of time (e.g., 10 seconds), the least-squares method is applied with respect to the valid GPS data items of the number set by the condition setting section 15, the GPS data items having been generated at the receiving section 12 during that period of time, and the result of the least-squares method is outputted as positioning data.

The condition setting section 15 follows the selection signal outputted from the navigation device 2, and selects a condition (the number of valid GPS data generated within the second predetermined period of time at the receiving section 12) to be set in the filter section 13c.

Even with the above configuration, similarly to the case of GPS receiver 1, it is possible to output the positioning data having a positioning precision or a positioning rate appropriate to the intended use, according to a selection signal.

As explained so far, according to the present invention, it is possible to output from the GPS receiver, positioning data having a positioning precision or a positioning rate appropriate to the intended use.

What is claimed is:

1. A GPS (Global Positioning System) receiver, comprising:
   a receiving means which sequentially generates GPS data including current position information, based on signals received from GPS satellites;
   a plurality of filtering means which perform filtering with respect to the GPS data sequentially generated by said receiving means and generate positioning data including the current position information; and
   a positioning data output means which selects any one of said plurality of filtering means according to a selection signal, and outputs the positioning data generated by the filtering means thus selected.

2. A GPS receiver according to claim 1, wherein,
   respective positioning precisions of said plurality of filtering means are different from one another.

3. A navigation device that is utilized being connected with the GPS receiver according to claim 1, comprising:
   a navigation means which performs navigation process by use of the positioning data outputted from said GPS receiver;
   a telematics means which performs telematics process by use of the positioning data outputted from said GPS receiver; and
   a selection signal output means which outputs said selection signal to said GPS receiver, wherein,
   said selection signal output means outputs a first selection signal as said selection signal allowing a positioning precision of said GPS receiver to be equal to or more than a predetermined value, when said navigation means utilizes said positioning data, and outputs a second selection signal as said selection signal allowing a positioning rate of said GPS receiver to be equal to or more than a predetermined value, when said telematics means utilizes said positioning data.

4. A navigation device according to claim 3, further comprising:
   a positioning rate measuring means which measures the positioning rate of said GPS receiver, wherein,
   said selection signal output means outputs said second selection signal, when said telematics means utilizes said positioning data and said positioning rate measured by said positioning rate measuring means is less than the predetermined value.

5. A navigation system comprising the GPS receiver and the navigation device according to claim 3.

6. A GPS (Global Positioning System) receiver, comprising:
   a receiving means which sequentially generates GPS data including current position information, based on signals received from GPS satellites;
   a filtering means which performs filtering with respect to the GPS data sequentially generated by said receiving means according to a given condition, and generates positioning data including the current position information; and
   a positioning data output means which selects said given condition as one of a plurality of conditions being prepared according to a selection signal, provides said condition to said filtering means, and outputs the positioning data generated by said filtering means.

7. A GPS receiver according to claim 6,
   according to said plurality of conditions being prepared, a positioning precision of said filtering means is made different for each condition.

8. A navigation device that is utilized being connected with the GPS receiver according to claim 6, comprising:
   a navigation means which performs a navigation process by use of the positioning data outputted from said GPS receiver;
   a telematics means which performs telematics process by use of the positioning data outputted from said GPS receiver; and
   a selection signal output means which outputs said selection signal to said GPS receiver, wherein,
   said selection signal output means outputs a first selection signal as said selection signal allowing a positioning precision of said GPS receiver to be equal to or more than a predetermined value, when said navigation means utilizes said positioning data, and outputs a second selection signal as said selection signal allowing a positioning rate of said GPS receiver to be equal to or more than a predetermined value, when said telematics means utilizes said positioning data.

9. A navigation device according to claim 8, further comprising:
   a positioning rate measuring means which measures the positioning rate of said GPS receiver, wherein,
   said selection signal output means outputs said second selection signal, when said telematics means utilizes said positioning data and said positioning rate measured by said positioning rate measuring means is less than the predetermined value.

10. A navigation system comprising the GPS receiver and the navigation device according to claim 8.

* * * * *